Dec. 3, 1935.    M. P. FUGLE    2,023,069
LIQUID REFRIGERATING UNIT
Filed Oct. 22, 1934    2 Sheets-Sheet 1
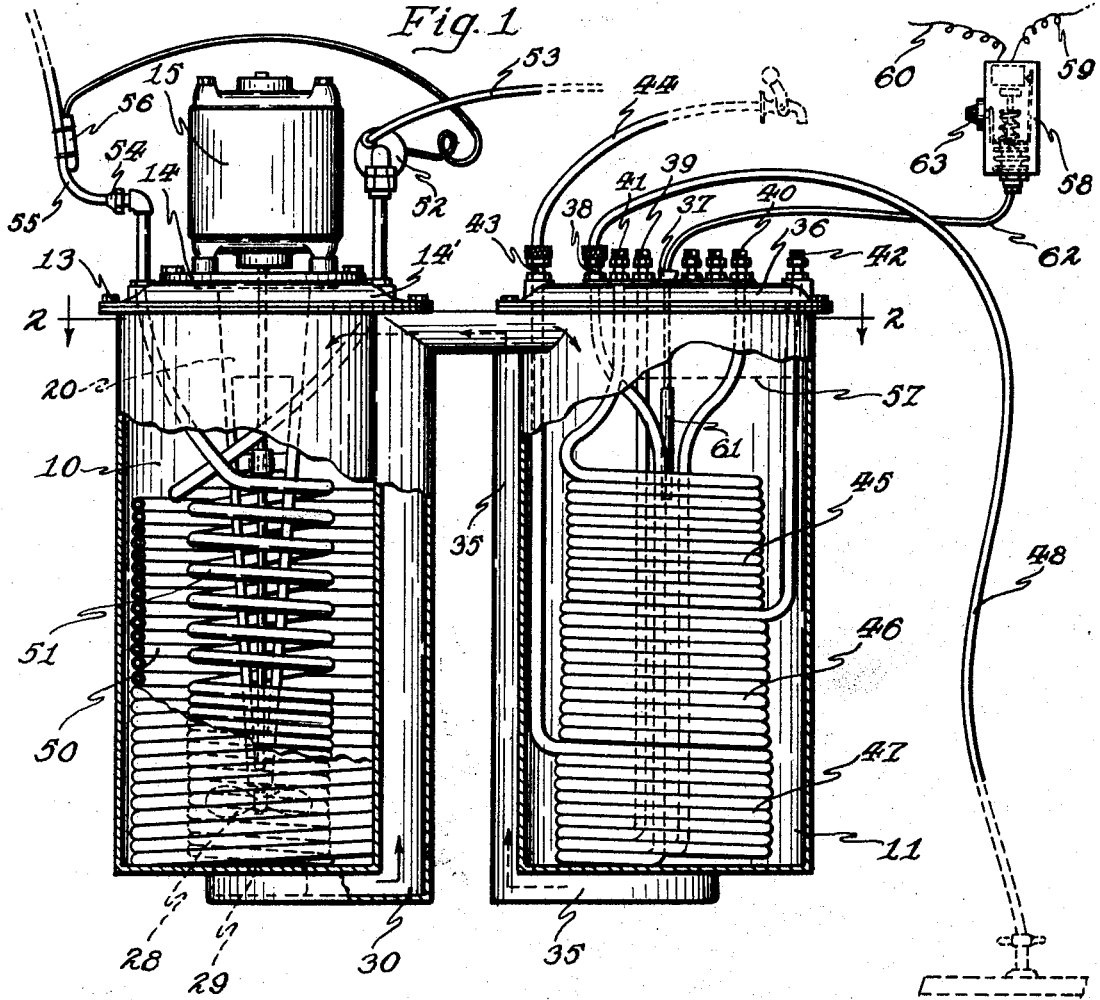
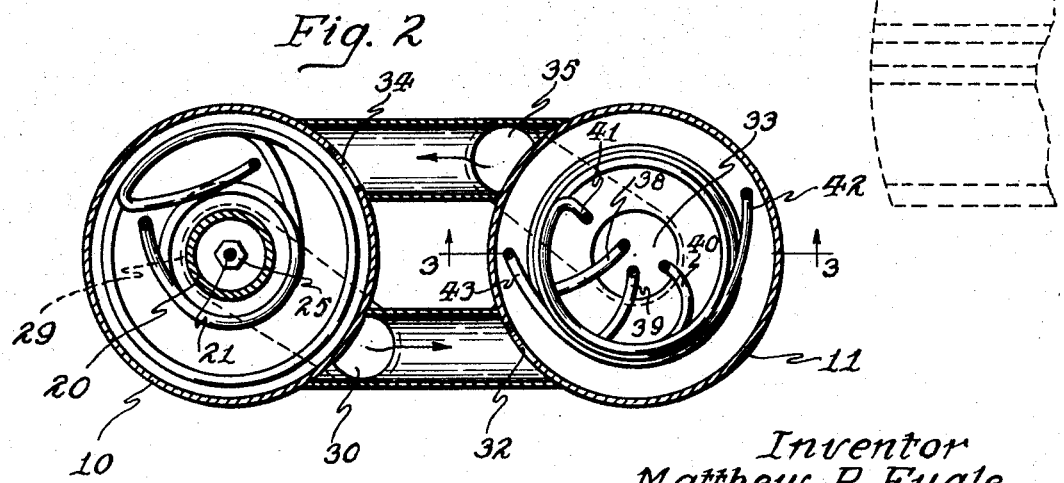
Inventor
Matthew P. Fugle
John F. Brezina
atty.

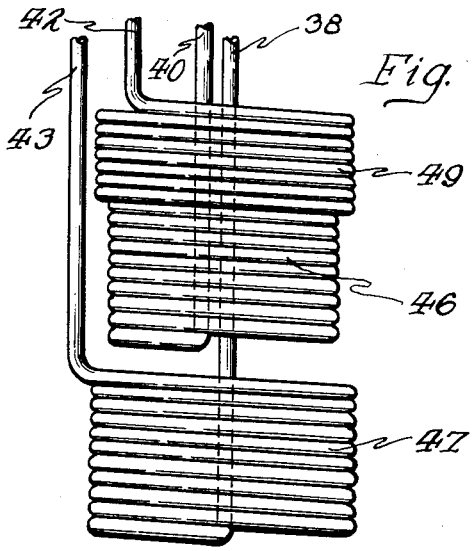
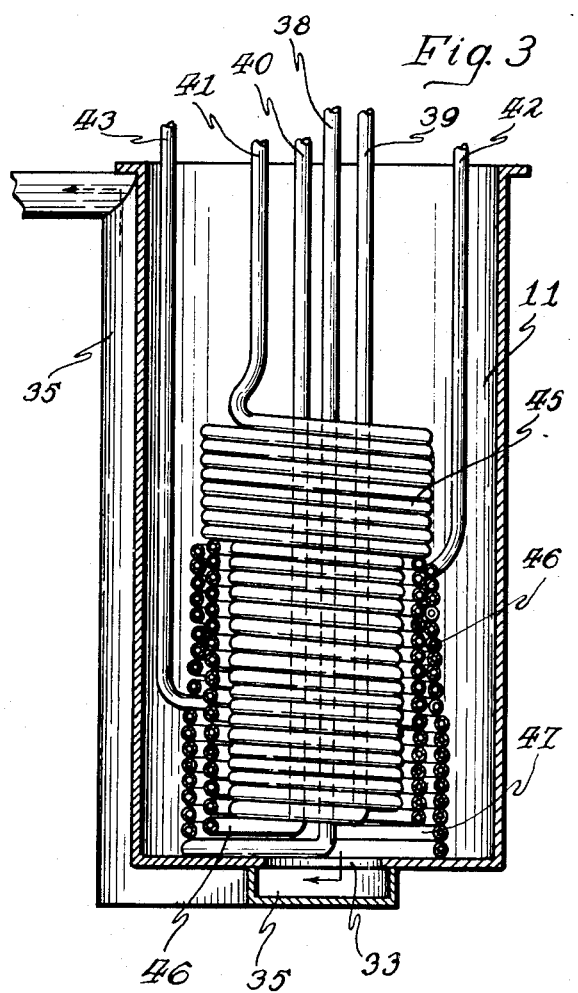
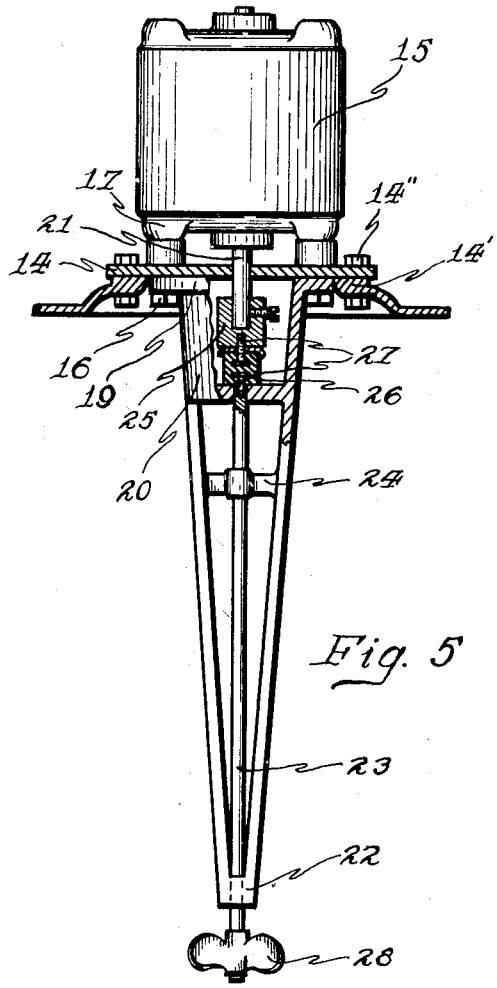

Patented Dec. 3, 1935

2,023,069

UNITED STATES PATENT OFFICE 2,023,069

LIQUID REFRIGERATING UNIT

Matthew P. Fugle, Oak Park, Ill., assignor of one-half to Larkin Refrigerating Corporation, Atlanta, Ga., a corporation of Georgia Application October 22, 1934, Serial No. 749,392

13 Claims. (Cl. 62—101)

This invention is directed to certain improvements in a refrigerating apparatus and an efficient operation thereof and which is particularly adaptable for use in connection with the cooling of beer or other liquids where a substantially constant and uniform temperature is necessary and wherein material fluctuation or rise of temperature is a serious objection and must necessarily be avoided. The art of cooling beer in relatively small units installable in counters or bars of conventional size has heretofore presented difficult and heretofore unsurmounted problems which have arisen from one or more of the following difficulties: Freezing of the beer when the same has not been drawn off from the beer coils at substantially uniform periods due to too intensive or direct contact with refrigerant-containing coils; repeated absorption of heat units by only the upper part of the beer coils while the lower part is maintained colder than it should be and resulting in freezing of the beer at the bottom of the coil; inadequate and too slow cooling when a larger volume of beer is drawn off in succession, the new beer entering the coil not having time to become sufficiently cool; inadequate circulation of a cooling refrigerant, the temperature of which at certain points is many degrees colder than at other or higher points in the container which is sometimes due to attempts to control the frequency and running of the refrigerant compressing machinery by the temperature of a liquid cool'ng medium at a given point. A further difficulty which has been encountered heretofore in connection with the use of two tanks has been that the metal means for connecting the two compartments or tanks permits excessive and objectionable heat conductivity causing freezing of the liqu'd cooling medium in the lower part of the beverage coil receptacle from which the heat is first absorbed.

The invention described and claimed in the following application is an improvement of various features of my co-pending application for patent Serial No. 697,394 for Refrigerating unit.

It is therefore an important object of my invention to provide a refrigerating unit having a pair of liquid spaced apart cooling medium receptacles connected together only by conduits, preferably made of metal, the cross sectional area of which is relatively small and so limited as to eliminate an objectionable degree of absorption through the metal by the refrigerant coil tank and from the beverage coil receptacle.

A further important object of my invention is the provision of a refrigerating unit wherein spaced apart receptacles or tanks are employed, one containing a refrigerant coil, the other beverage coils, so connected together to provide a novel circulation and operation of a liquid cooling medium contained in said tanks and circulated by suitable mechanical means to maintain a substantially uniform temperature of such cooling medium at all points within the beverage coil tank, this further eliminating the normally present objectionable over-cold area created by convection. More particularly, the important object is the prevention of a maintenance of an over-cold portion of a liquid cooling medium at the bottom of the beverage coil-containing receptacle and resultant freezing from the bottom thereof, and to effect an operation and circuit of enforced travel for the liquid cooling medium to cause the liquid cooling medium to enter the beverage coil-containing tank at its top to mix with, displace, lower and expel the warmer upper portion of the body of cooling medium in the beverage coil tank.

A further object of my invention is the provision of a refrigerating unit wherein a liquid cooling medium is circulated in a continuous circuit through and between the spaced apart tanks, one of said tanks having suitable electrically driven means for enforcing the desired circulation of the liquid cooling medium, said tank having refrigerant coils therein connected to a suitable refrigerant compressor mechanism, and said mechanism being thermostatically controlled by fluctuation or rise of temperature at the outlet end of a beverage coil contained in the second of said tanks.

A further object of my invention is the provision of a new method of winding and assembling a plurality of beverage coils in such a manner that certain parts of said coils are in superposed nested relation, certain parts of said coils are in concentric relation and each of said coils have their concentric portions substantially near and equi-distant to the bottom of their container through which a cooling medium is circulated.

Other and further objects of this invention will be apparent from the following specification and claims.

This invention (in the preferred form) is illustrated in the following specification and claims.

On the drawings:

Fig. 1 is a side elevational view of my refrigerating apparatus with forward portions of the tanks broken away, and illustrating the connections to the respective parts.

Fig. 2 is a cross sectional view of my unit taken from above on line 2—2 of Fig. 1.

Fig. 3 is a cross sectional view of the beverage coil-containing tank illustrating the preferred manner of superposed and concentric mounting of three beverage coils.

Fig. 4 is a fragmentary view illustrating the construction and shape of a pair of beverage coils prior to assembling into interfitting and semi-concentric position.

Fig. 5 is a side elevational view of the electric motor, propeller and mounting means therefor secured upon the cover of the refrigerant coil-containing tank.

The reference numerals 10 and 11 indicate a pair of spaced apart metal tanks, in the preferred form being shown as of cylindrical construction but which may be variously shaped. The tank 10 has secured and sealed thereon by a plurality of suitable bolts 13 the cover plate 14, said cover plate being secured to a convex annular ring 14. A plurality of short bolts 14" removably secure said cover and attached parts to ring 14, said bolts passing through suitable apertures formed in said cover and ring respectively as shown. This construction is particularly desirable and novel in that it permits quick and convenient removal of the motor 15, cover 14 and propeller and mountings therefor whenever it is desired to service the refrigerant unit. The electric motor 15 is secured on cover 14 by means of a plurality of mounting bolts 16, preferably three in number, which pass through suitably spaced apertures formed in the flat portion of said cover 14 and threadingly engage respective threaded portions formed in the lower end plate 17 of the electric motor 15. Said bolts also pass through suitably and correspondingly spaced apertures formed in the annular and integral shaft flange 19 of a substantially cone-shaped shaft mounting member 20 and secure said member 20 to said cover 14 on the side opposite to said motor, as clearly indicated in Fig. 5. Said electric motor 15 has a conventional armature and a central armature shaft 21, the lower end of which extends downwardly through a suitable aperture in said cover 14 and projects therebelow, as shown in Fig. 5. The lower end of said shaft journalling member 20 comprises two spaced apart arms which converge toward each other and meet at a common point indicated by the reference numeral 22 at which a longitudinal aperture is formed to provide for the convenient journalling of a propeller shaft 23. The cross brace 24 is also apertured and the upper portion of said shaft 23 is journalled therein, and the upper end of said shaft is connected to armature shaft 21 to rotate therewith by means of the suitable flexible coupling 25, said flexible coupling having its upper portion secured to the lower end of said armature shaft 21 by means of a suitable set screw as shown, and having an intermediate rubber block 26, said rubber block having moulded therein a pair of oppositely directed threaded screws 27. The lower of said screws 27 threadingly engages the upper end of propeller shaft 23 and the upper of said screws 27 is suitably threaded in the coupling 25 formed in the upper portion of said flexible coupling, as shown. A metal propeller 28 is held in securely mounted position on the lower end of shaft 23 by means of a suitable nut as shown.

The bottom of said cylindrical tank 10 has a central aperture 29 formed therein, as shown in Fig. 2. A semi-cylindrical metal conduit 30, which is preferably secured by welding or the like in vertical position upon the side wall of the tank 10, has its lower horizontally extending end portion likewise secured to the bottom of said tank and the end thereof suitably secured in said tank outlet 29 to form sealing engagement therewith. The upper end of said conduit 30 is formed to extend horizontally and perpendicularly, the actual end thereof being permanently secured by welding or the like in a suitable aperture 32 formed in the side and at the upper edge of tank 11, as clearly indicated in Figs. 1 and 2.

A central aperture 33 is formed in the bottom of the tank 11 which is connected to and in communication with an inlet port 34 formed in the side and at the upper edge of tank 10 by means of a metal conduit 35, said conduit being preferably secured to and extending along the bottom and vertical side of tank 11 and then horizontally at its upper end, as clearly shown in Figs. 1 and 2. A cover plate 36 forms a sealing element for the upper end of tank 11 and has formed therein a plurality of spaced apart apertures, preferably nine in number, one thereof indicated by the reference numeral 37 being for conveninent insertion and mounting therethrough of one end of a thermostat thermometer, two of each of the remaining apertures having secured and sealed therein the inlet and outlet ends respectively of each beverage coil contained within said tank 11. Each of said inlet and outlet ends have securely mounted thereon a suitable bushing to provide quick and convenient attachment thereto of inlet pipes from kegs or the like and of outlet pipes leading to the draft faucets at the bar. The preferred form of my apparatus shown in the drawings shows three separate coils, 45, 46 and 47, in superposed and semi-concentric relation, the inlet ends being indicated by the reference numerals 39, 40 and 38 respectively and the outlet ends thereof being indicated by reference numerals 41, 42 and 43 respectively. An outlet pipe 44, shown only in part, is illustrated as being connected at one end to the bushing at the outlet end 41 of beverage coil 47 and its opposite end connected to a suitable faucet as shown in dotted lines. Likewise for illustrative purposes, inlet 38 of beverage coil 47 is connected to a beer supply keg by means of piping 48. A further important feature of my invention is the fact that the lower horizontal and vertical portions of conduit 30 are formed immediately on and in contact with the metal bottom of the refrigerant tank and the metal side of the refrigerant tank, as clearly shown in the top plan view of Fig. 2. It will be noted that a portion of the tank or compartment itself forms a portion of the wall of the conduit 30, namely that conduit 30 may be formed of a trough-like metal member which may be welded or otherwise secured to the bottom and side wall respectively of the tank 10. Likewise, conduit 35 is similarly formed so that one wall of the tank 11 forms a part of the conduit per se along the bottom and horizontal walls. It should be borne in mind that conduits 30 formed in this manner or in an equivalent mechanical manner may be either on the inside of the respective tanks or on the outside thereof, in either case being in direct contact with the respective tank walls. This construction has several advantages, in addition to economy, in that the bottom horizontal and vertical portions of each said conduits are themselves maintained relatively cold due to absorption of heat therefrom directly through the metal walls themselves and likewise absorption of heat, (conductivity of cold) directly from the refrigerant in the tanks to both the metal portions of the conduits which are in contact with the tanks and to the liquid refrigerant which may be moving therethrough.

An important feature of my invention is the novel manner of winding a plurality of beer coils in such a manner that a substantial part of each of said coils, when installed, will be near the bottom of the beverage coil-containing tank so that approximately the same area of each of said coils is at substantially the same height or distance from the bottom or top of the beer coil-containing tank. This is highly important in that heretofore several coils wound in the ordinary manner and superposed above each other have resulted in a noticeable and objectionable variation in the temperatures of beer drawn from such respective coils, this being due to the convection and the tendency of a warmer cooling medium constantly rising toward the upper part of the beer coil container. In my novel construction which is illustrated particularly in Figs. 3 and 4 the reference numeral 47 indicates the lowermost coil having convolutions of the greatest diameter and having its inlet directly upon the bottom of tank 11 and above the outlet port 33. The beverage coil 46 is wound of a slightly shorter diameter than that of coil 47 and with the coil continuing into an outer second roll of coils enclosing substantially one-half of the upper half of the first formed inner coils as indicated at 49 in Figs. 3 and 4. The lower reduced portion of coil 46 is adapted to fit within coil 47, as clearly shown in Figs. 3 and 4, the lowermost coil of the greater diameter of coil 46 resting upon the upper edge of coil 47. Beverage coil 45 is similarly formed with a relatively smaller diameter over the greater portion of its length so as to fit within coil 46 and extend to a point substantially near the bottom of the beverage coil tank. The upper part of coil 45 is continued into a greater diameter than the lower part, the lowest convolution of said upper portion resting upon coil 46. Similarly one or a greater number of coils could be formed where desired in like manner to interfit in superposed nested relation. A further important feature of this construction is that the inlet of said superposed nested beverage coils 45, 46 and 47 extends substantially vertically and downwardly to a point adjacent the bottom of the tank 11, thereafter continuing in convolutions, this insuring that the beer must necessarily pass through substantially the same areas of cooling medium contained in said tank.

A single continuous refrigerant coil 50, preferably formed with convolutions of a large diameter and then continuing into convolutions of a much smaller diameter to form an inner spiral 51 is contained within tank 10, the coils at the lower part of the inner spiral of coils 51 being relatively close together whereas the upper portions of said inner spiral 51 are preferably spaced apart to permit better circulation enforced by the motor driven propeller hereinbefore described. The diameter of inner spiral 51 of the refrigerant coil is preferably a little longer than the diameter of the circle of movement of propeller 28, said adjacent lower coils preventing radial and lateral movement and flow of the liquid cooling medium when said propeller 28 is rotated, and causing substantially all the force of said propeller to enforce a downward flow of the cooling medium through the conduit 30 and into tank 11.

The inlet end of refrigerant coil 50 is suitably connected to one end of an expansion valve 52, said expansion valve being in turn connected by a suitable feed pipe 53 (shown in part) to the outlet side of a conventional refrigerant compressing unit. The outlet end of refrigerant coil 50 is connected by suitable fittings 54 at one end of pipe 55 which has its other end connected to an intake chamber of a conventional refrigerant compressing unit. A thermostat 56 of conventional construction is preferably secured immediately adjacent and in contact with the outlet pipe 55 and is also connected with expansion valve 52 to control said expansion valve and to in turn control and regulate the circulation and volume of refrigerant passing through refrigerant coil 50.

The reference numeral 58 indicates an automatically operating thermostatic electric switch for controlling the frequency of operation of the motor driven propeller 28 and having one electrical connection 60 to motor 15 driving the propeller and having its feed line 59 connected to a source of electricity. A thermometer 61 connected by suitable tubing 62 to said control switch 58 regulates the operation of said switch and causes the same to respond to slight fluctuation or rise of the temperature at the position of the thermometer 61 which is immediately adjacent and between the inlet portions of the beer coils at a point where the same are relatively close together. Said motor control switch 58 has a manually operable knob 63 and suitable means connected thereto for varying the range of temperature desired on the inlet end of the beer coils. The reference numeral 57 indicates a liquid cooling medium which may be a mixture of glycerine and water or a suitable brine.

It will be apparent that the mechanism and means which I have described for absorbing heat and thereby cooling the liquid cooling medium 57 will operate continuously due to the action of thermostat 56 and its control of the operation of the motor driven propeller so that the liquid cooling medium will be circulated at desired intervals in a circuitous route by the motor driven propeller in such a manner that the colder descending liquid cooling medium will be forced to mix with and displace the warmer cooling medium at the top of the beverage coil-containing tank, namely first into and through conduit 30, thence into the top of tank 11, thence downwardly and into conduit 35 and thence upwardly to be discharged back into the upper part of the tank 10. The propulsion of said liquid cooling medium in the afore-described manner constitutes the difference between success and failure over previously known methods due to afore-mentioned disastrous freezing where adjacent units have their bottoms directly connected together and wherein the liquid cooling medium is introduced directly from the bottom of one into the bottom of the other.

It will further be apparent that I have provided an apparatus wherein the refrigerant compression machine and introduction of refrigerant into a refrigerant coil is automatically and thermostatically controlled by slight fluctuation or rise of beer at the inlet side of a beer coil, the beer coils being uniformly cooled by a continuous circulation of the cooling medium.

I am aware that numerous details of construction may be varied through a wide range without departing from the principles of this invention, and I therefore do not desire to limit the patent granted hereon otherwise than necessitated by the prior art.

I claim as my invention:

1. A beverage refrigerating unit comprising, in combination two spaced apart receptacles forming spaced apart compartments adapted to hold a circulating refrigerant; a refrigerant coil in one compartment; a beverage coil in the other compartment; said refrigerant coil-containing compartment having a bottom outlet port in its lower end and an inlet port adjacent its top, said beverage coil having an outlet port in its bottom and an inlet port adjacent its top; a conduit pipe connecting the bottom of said outlet port of said refrigerant coil-containing compartment and the upper inlet port of said beverage coil compartment; a second conduit pipe connecting the bottom of said beverage coil-containing compartment and the top of said refrigerant coil-containing compartment; a motor driven propeller in said refrigerant coil-containing compartment for circulating a refrigerant first downwardly then outwardly and upwardly through said upper inlet port of said beverage coil-containing compartment, thence downwardly and outwardly through said bottom outlet port and back into the top of said refrigerant coil-containing compartment, said refrigerant entering said beverage coil compartment of its top to effect a continuous agitated flow thereof from the upper toward the bottom part of said beverage coil compartment and thereby compelling a continuous and steady displacement of refrigerant about said beverage coil.

2. A liquid refrigerating unit comprising in combination a pair of spaced apart compartments; a refrigerant coil in one compartment; a liquid coil in the other compartment; a conduit having the greater portion thereof adjacent to and in contact with the wall of said compartment to provide for heat conductivity therebetween, said conduit connecting the bottom of said refrigerant coil compartment to the top of said liquid coil compartment; a second conduit connecting the bottom of said liquid coil compartment and the top of said refrigerant coil compartment said conduit extending along the bottom and vertical wall of said liquid coil compartment and in direct contact therewith, said compartments having cooling medium circulating from the bottom of said refrigerant coil-compartment to the upper part of said liquid coil compartment and thence downwardly therethrough, thence from the bottom of said liquid coil-compartment upwardly and into the top of said refrigerant coil-compartment and a motor driven propeller in said refrigerant coil-compartment providing said circulation.

3. A liquid refrigerating unit comprising in combination a pair of spaced apart compartments; a refrigerant coil in one compartment; a liquid coil in the other compartment; a conduit connecting the bottom of said refrigerant coil compartment to the top of said liquid coil-compartment, said conduit extending from the bottom of said compartment immediately on and in heat-conducting contact with the vertical wall of said compartment; a second conduit connecting the bottom of said liquid coil-compartment and the top of said refrigerant coil-compartment, the vertical portion of said conduit being formed along and in heat-conductive contact with the vertical side wall of said liquid coil compartment, said compartments having cooling medium circulating from the bottom of said refrigerant coil-compartment to the upper part of said liquid coil-compartment and thence downwardly therethrough, thence from the bottom of said liquid coil-compartment upwardly and into the top of said refrigerant coil-compartment, and a motor driven propeller in said refrigerant coil-compartment providing said circulation, said propeller being disposed to provide a circulating stream which enters the upper part of said liquid coil compartment and continuously forces downward and out the warmer liquid cooling medium in the upper part of said liquid coil-compartment.

4. A liquid refrigerating unit comprising in combination a pair of spaced apart compartments; a refrigerant coil in one compartment; a liquid coil in the other compartment; a conduit connecting the bottom of said refrigerant coil-compartment to the top of said liquid coil-compartment the vertical portion of said conduit being formed against and in contact with the vertical wall of said compartment; a second conduit connecting the bottom of said liquid coil compartment and the top of said refrigerant coil-compartment said conduit being formed so that one part of said tank forms a part of the wall of the conduit to provide for direct heat-conductivity therethrough, said compartments having cooling medium circulating from the bottom of said refrigerant coil-compartment to the upper part of said liquid coil-compartment and thence downwardly therethrough, thence from the bottom of said liquid coil-compartment upwardly and into the top of said refrigerant coil-compartment, and a motor driven propeller in said refrigerant coil-compartment providing said circulation, said propeller being disposed to provide a circulating stream which enters the upper part of said liquid coil-compartment and continuously forces downward and out the warmer liquid cooling medium in the upper part of said liquid coil-compartment, said warmer cooling medium being forced into the top of said refrigerant coil-compartment and then downwardly to contact and be repeatedly cooled by said refrigerant coil.

5. A liquid refrigerating unit comprising in combination a pair of spaced apart compartments; a refrigerant coil in one compartment; a liquid coil in the other compartment formed along and in contact with the bottom and vertical wall of said refrigerant coil compartment; a conduit connecting the bottom of said refrigerant coil-compartment to the top of said liquid coil-compartment; a second conduit connecting the bottom of said liquid coil-compartment and the top of said refrigerant coil-compartment the main portion of said conduit being formed upon and in contact with the compartment wall, said compartments having cooling medium circulating from the bottom of said refrigerant coil-compartment to the upper part of said liquid coil-compartment and thence downwardly therethrough, thence from the bottom of said liquid coil-compartment upwardly and into the top of said refrigerant coil-compartment, and a motor driven propeller in said refrigerant coil-compartment providing said circulation, said propeller being disposed to provide a circulating stream which enters the upper part of said liquid coil-compartment and repeatedly forces downward and out the warmer liquid cooling medium in the upper part of said liquid coil-compartment, said circulating cooling medium entering the top said liquid coil-compartment descending and bodily moving the cooling medium therein from about said liquid coils in a downward direction to compel continuous displacement thereof and to maintain the same at a substantially constant temperature both at the top and bottom of said compartment.

6. A liquid refrigerating unit comprising in combination a pair of spaced apart compartments; a refrigerant coil in one compartment; a liquid coil in the other compartment; a conduit connecting the bottom of said refrigerant coil-compartment to the top of said liquid coil-compartment; a second conduit connecting the bottom of said liquid coil-compartment and the top of said refrigerant coil-compartment, said compartments having cooling medium circulating from the bottom of said refrigerant coil-compartment to the upper part of said liquid coil-compartment and thence downwardly therethrough, thence from the bottom of said liquid coil-compartment upwardly and into the top of said refrigerant coil-compartment, and a motor driven propeller in said refrigerant coil-compartment providing said circulation, said propeller being disposed to provide a circulating stream which enters the upper part of said liquid coil-compartment and repeatedly forces downward and out the warmer liquid cooling medium in the upper part of said liquid coil-compartment, said circulating cooling medium entering the top of said liquid coil-compartment, descending and bodily moving the cooling medium therein from about said liquid coils in a downward direction to compel continuous displacement thereof and to maintain the same at a substantially constant temperature both at the top and bottom of said compartment, and a thermal-responsive element actuable by the temperature of the liquid passing through said liquid coil for controlling the operation of said motor driven propeller.

7. A beverage refrigerating unit, comprising, in combination, two compartments having passages substantially at or near their upper and lower ends communicating in such a way that the bottom passage of one compartment is connected to the upper end of the second compartment and the bottom of said second compartment is connected to the top of said first compartment and a cooling medium adapted to be circulated therethrough, a refrigerant coil in the first of said compartments, a beverage coil in the other compartment, and a motor driven propeller providing said circulation, said propeller being disposed in one of said passages to provide a forced circulating stream which enters said beverage coil compartment through the last said passage, the last said passage directing the forced circulating stream substantially centrally through said beverage coil compartment whereby to effect a continuous agitated flow surging through and over said beverage coil, the cooling medium entering said beverage coil compartment bodily moving the cooling medium therein in a downward direction to compel continuous displacement thereof over said beverage coil and back into the upper part of said refrigerant coil compartment through the other passage, and a thermal-responsive device actuable by the temperature of the beverage passing through said beverage coil for controlling the operation of said motor driven propeller.

8. In a refrigerating apparatus, two spaced apart tanks; a refrigerant coil in one tank; a beverage coil in the other tank; a bottom and top aperture in each of said tanks; a conduit connecting the bottom aperture of said refrigerant coil tank and the top aperture of said refrigerant coil tank; a second conduit connecting the bottom aperture of said beverage coil tank and the top of said refrigerant coil tank; a motor driven propeller in said refrigerant coil tank for circulating a cooling medium in a circuit between said tanks and through said conduits, said propeller being so located whereby to first force said cooling medium from the bottom of said refrigerant coil tank and thence into the top of said beverage coil tank and into circulation about and in contact with the upper part of said beverage coil.

9. In a refrigerating apparatus, two spaced apart tanks; substantially non-conductive connecting members therebetween; a refrigerant coil in one tank; a beverage coil in the other tank; a conduit connecting the bottom of said refrigerant coil tank and the top of said beverage coil tank; a second conduit connecting the bottom of said beverage coil tank and the top of said refrigerant coil tank; a motor driven propeller for circulating a liquid cooling medium through and between said tanks; a thermostat in said beverage coil tank adjacent the inlet of said beverage coil and actuable by temperature changes produced thereat by the beverage, said thermostat controlling said motor driven propeller, said propeller being adapted to circulate said cooling medium in substantial quantities to cause a continuous displacement thereof in said beverage coil tank and a maintenance of a substantially constant temperature at both the upper and lower parts of the beverage coil.

10. In a refrigerating apparatus, two spaced apart tanks; a refrigerant coil in one tank; a beverage coil in the other tank; a conduit connecting the bottom of said refrigerant coil tank and the top of said beverage coil tank; a second conduit connecting the bottom of said beverage coil tank and the top of said refrigerant coil tank; a motor driven propeller for circulating a liquid cooling medium through and between said tanks; a thermostat in said beverage coil tank adjacent the inlet of said beverage coil and actuable by temperature changes produced thereat by the beverage; said thermostat controlling said motor driven propeller, said propeller causing a substantially steady flow and displacement of the cooling medium in said beverage coil tank and upon the beginning of its descent from the top to the bottom of said beverage coil tank being adapted to absorb a greater number of heat units from the normally warmer upper portion of said beverage coil and thereby to maintain a substantially constant temperature throughout the cooling medium in the beverage coil tank.

11. In a refrigerating apparatus, two spaced apart tanks; a plurality of refrigerant coils in one tank; a plurality of beverage coils in the other tank; said beverage coils having substantial portions thereof adjacent the bottom of said tank and then gradually winding upwardly, said lower coil portions being substantially concentric with respect to each other; a conduit connecting said refrigerant coils tank and the top of said beverage coil tank; a second conduit connecting the bottom of said beverage coil tank and the top of said refrigerant coil tank; a motor driven propeller for circulating the liquid cooling medium through said tanks and conduits, said propeller being so located as to first force said cooling medium downwardly and horizontally from the bottom of said refrigerant coils tank and thence upwardly and into the top of said beverage coil tank and thence upwardly about said beverage coil and thence into the top of said refrigerant coils tank.

12. In a refrigerating apparatus, a pair of spaced apart tanks; a continuous refrigerant coil in one tank; a plurality of beverage coils in the other tank, said coils being interfitting and partially concentric with respect to each other, portions of each of said beverage coils being substantially adjacent the bottom of said tank; a conduit connecting the bottom of said first mentioned tank and the top of said beverage coil tank; a second conduit connecting the bottom of said beverage coil tank and the top of said first mentioned tank; a motor driven propeller for circulating a liquid cooling medium through said tanks and conduits in a substantially common direction; a thermostat in contact with and adjacent the inlet of said beverage coil and actuable by temperature changes produced thereat by the beverage, said thermostat controlling the said motor driven propeller and the volume of liquid cooling medium introduced into contact with said beverage coils.

13. In a refrigerating apparatus, two spaced apart tanks; a refrigerant coil in one tank having inlet and outlet connections; a plurality of beverage coils in the other tank superposed with respect to each other and each of said beverage coils having a portion thereof adjacent the bottom of said tank and in concentric relation with respect to the lower portions of the adjacent beverage coils; a conduit connecting the bottom of said first mentioned tank and the top of said beverage coil tank; a second conduit connecting the bottom of said beverage coil tank and the top of said refrigerant coil tank; and a motor driven propeller for circulating a liquid cooling medium through said tanks and conduits to cause a substantially constant and uniform displacement thereof in said beverage coil tank.

MATTHEW P. FUGLE.